(12) United States Patent
Huang

(10) Patent No.: US 8,244,037 B2
(45) Date of Patent: Aug. 14, 2012

(54) IMAGE-BASED DATA MANAGEMENT METHOD AND SYSTEM

(75) Inventor: Yung-Chun Huang, Shanghai (CN)

(73) Assignee: Master Wave International Company Ltd, Ming-Hang District, Shanghai (CN)

( * ) Notice: Subject to any disclaimer, the term of this patent is extended or adjusted under 35 U.S.C. 154(b) by 1125 days.

(21) Appl. No.: 11/985,642

(22) Filed: Nov. 15, 2007

(65) Prior Publication Data

US 2009/0132590 A1 May 21, 2009

(51) Int. Cl.
*G06F 17/30* (2006.01)
*G06F 9/22* (2006.01)

(52) U.S. Cl. ........ 382/181; 382/100; 382/313; 382/317; 707/104.1; 707/E17.019

(58) Field of Classification Search .................. 382/100, 382/181, 313, 317; 707/104.1, E17.019
See application file for complete search history.

(56) References Cited

U.S. PATENT DOCUMENTS

| | | | |
|---|---|---|---|
| 4,914,709 A | 4/1990 | Rudak | |
| 5,003,613 A | 3/1991 | Lovelady et al. | |
| 5,237,628 A | 8/1993 | Levitan | |
| 5,455,875 A | 10/1995 | Chevion et al. | |
| 5,729,741 A | 3/1998 | Liaguno et al. | |
| 6,055,336 A | 4/2000 | Niki | |
| 6,243,503 B1 | 6/2001 | Teufel et al. | |
| 6,563,948 B2 * | 5/2003 | Tan et al. | 382/187 |
| 6,741,743 B2 | 5/2004 | Stalcup et al. | |
| 6,889,213 B1 | 5/2005 | Douvikas et al. | |
| 7,593,605 B2 * | 9/2009 | King et al. | 382/313 |
| 7,702,128 B2 * | 4/2010 | Cohen et al. | 382/100 |
| 7,986,843 B2 * | 7/2011 | Chaudhury et al. | 382/229 |
| 2006/0103893 A1 * | 5/2006 | Azimi et al. | 358/474 |

FOREIGN PATENT DOCUMENTS

| | | | |
|---|---|---|---|
| CN | 1567955 A | 1/2005 | |
| CN | 201004228 Y | 1/2008 | |
| CN | 101295385 A | 10/2008 | |
| JP | 2001-52112 A | 2/2001 | |
| KR | 10-2007-0044538 A | 4/2007 | |

* cited by examiner

*Primary Examiner* — Stephen R Koziol
(74) *Attorney, Agent, or Firm* — Silicon Valley Patent Group; Thomas Chan

(57) ABSTRACT

Methods and systems are provided for storing, organizing, and accessing image-based documents. The method includes receiving an image-based document, conducting an OCR conversion process to produce an equivalent document in text format, identifying keywords of the equivalent document in text format, linking the keywords with the image-based document and the corresponding equivalent document in text format, and storing the image-based document, the corresponding equivalent document in text format, and the keywords in a relational database.

22 Claims, 13 Drawing Sheets

IMAGE-BASED DATA MANAGEMENT METHOD AND SYSTEM

FIELD OF THE INVENTION

The present invention relates to the field of data management systems. In particular, the present invention relates to a method and system for storing, organizing, and accessing image-based data.

BACKGROUND OF THE INVENTION

FIG. 1 illustrates a conventional method for storing image-based data. In the traditional approach, Text information of an original image-based document 102 is entered into the computer manually 104, and the manually entered text information is saved in a database 106 for future use. Though the conventional method typically preserves the text information of the original document, it does not preserve other information accompanying the text in the original document, such as the color, layout, typesetting, etc, which may carry important information about the original document. Therefore, in the event the original document 102 is lost, not all contents of the original document can be recovered from the database 106.

Therefore, there is a need for addressing the issues of the conventional method for storing image-based data.

SUMMARY

With the rapid development of information technologies, information carried by image contents has increased exponentially. Some commonly used image formats include .bmp, .gif, .jpg, .pdf, etc. Image-based documents may be easily entered into a computer. To do so, people may use devices like digital cameras or scanners to transfer image-based documents into the computer, for example a snapshot of a train schedule taken at the train station, a scanned image of a business card, or a microfilm image of a library collection. By using the data management system of the present invention based on images of the original document, vast amount of information may be accumulated very quickly. As a result, demands for searching such image-based document are generated. To address the need of searching such image-based document, methods and systems for storing, managing, and access image-based documents are disclosed.

In one embodiment, a method for organizing business cards includes receiving a business card in image format, conducting an optical character recognition (OCR) conversion process to produce an equivalent business card in text format, identifying keywords of the equivalent business card in text format, linking the keywords with the business card in image format and the corresponding equivalent business card in text format, and storing the business card in image format, the corresponding business card in text format, and the keywords in a relational database.

In another embodiment, a system for organizing business cards on a website includes one or more servers for interface between client devices through a communication network. The one or more servers further include logic configured to receive a business card in image format, logic configured to conduct an OCR conversion process to produce an equivalent business card in text format, logic configured to identify keywords of the equivalent business card in text format, logic configured to link the keywords with the business card in image format and the corresponding equivalent business card in text format, and logic configured to store the business card in image format, the corresponding business card in text format, and the keywords in a relational database.

In yet another embodiment, a method for organizing image-based data includes receiving an image-based document, conducting an OCR conversion process to produce an equivalent document in text format, identifying keywords of the equivalent document in text format, linking the keywords with the image-based document and the corresponding equivalent document in text format, and storing the image-based document, the corresponding equivalent document in text format, and the keywords in a relational database.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the figures.

DESCRIPTION OF EMBODIMENTS

Methods and systems are provided for storing, managing, and accessing image-based documents. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 2:
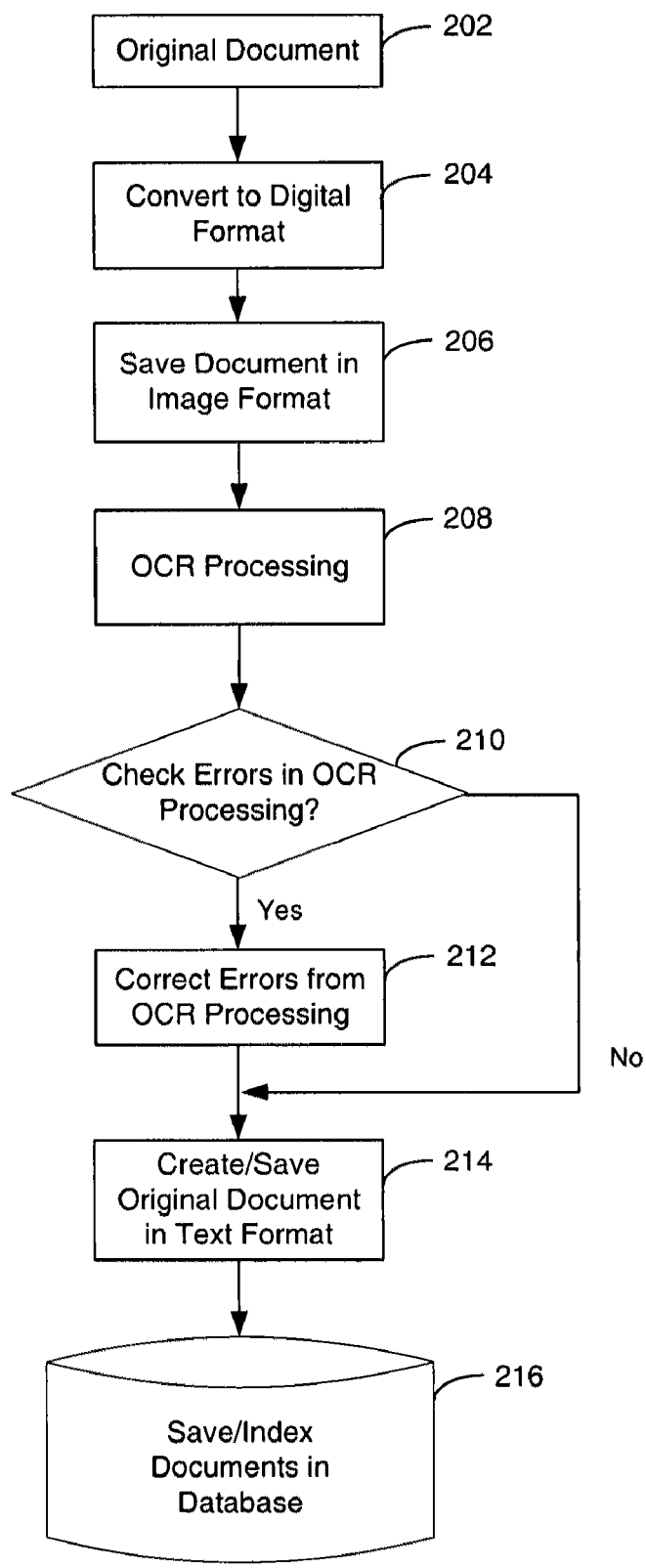
FIG. 2 illustrates a method for storing and organizing image-based data according to an embodiment of the present invention.

FIG. 2 illustrates a method for storing and organizing image-based data according to an embodiment of the present invention. As shown in FIG. 2, the method starts with an original document in block 202, which may be a book, magazine, business card, product manual, fax, or information presented in other formats. In block 204, the method converts the original document to digital format using commonly available equipments, such as scanners, digital cameras, or other digital input devices. In block 206, the converted image-based document is saved in a digital format in a computer. In particular, the image-based documents may be saved in .jpg, .pdf, .tiff, or other digital formats.

In block 208, the method performs an optical character recognition (OCR) conversion process to convert the image-based data saved in block 206 to a text format. This process is accomplished by recognizing the character information in the image format of the original document. Note that the current OCR conversion process does not produce a 100% correct recognition rate. Thus, some characters in the original document may be incorrectly recognized. Since errors may be introduced by the OCR conversion process, the method checks for errors that may be produced in the OCR processed document in block 210. Thereafter, a determination is made in response to whether errors are found in the OCR processed document. If errors are not found in the OCR processed document (210_No), the method goes to block 214.

In the alternative (210_Yes), the method moves to block 212 where it corrects errors generated from the OCR conversion process in block 208. The user may edit and correct the OCR processed results if necessary. Note that in certain applications, the method may not require the OCR processed results to be absolutely correct. For example, absolute accuracy is not required when the information is used only for indexing of the original document.

In block 214, the document is saved in text format, using either the OCR processed document from block 210 or using the user-corrected document from block 212. In block 216, the method transfers and stores the document in both the image format and OCR processed text format in a relational database, where the method uses the character information derived from the OCR conversion process for indexing. One example is a full-text indexing of the document. Upon completion of block 216, a user may apply a full-text search of the document in text format in the relational database or search for certain particular information contained in the document.

As shown in the method described above, the image format of the original document may include a special format, which can not be saved in the relational database directly through the conventional method of manual data entry. Thus, after the original document is scanned, an OCR conversion process is applied to recognize the character information in the scanned image. A user may manually edit the OCR generated text document to correct any errors if necessary. The original image document and the character information expressed in the document may be saved in a relational database as a record item, and the character information may be indexed. Using this method, each image format of the document can be recorded by one or more keywords, and the information contained in each document can be searched using a full-text indexing technique. As a result, not only does the method of the present disclosure preserve the visual information of the original document, it also saves time and effort required for storing such documents significantly.

Figure 1:
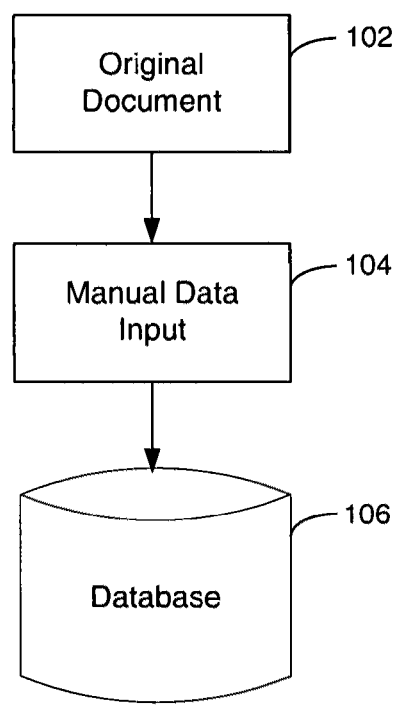
FIG. 1 illustrates a conventional method for storing image-based data.

Comparing the conventional method described in FIG. 1 and the method described in FIG. 2, one may note that the conventional method requires manual data entry of the original document into a computer, which is tedious, time consuming, and does not capture all information contained in the original document. On the other hand, with the approach described in FIG. 2, digital input devices like digital camera and scanner are used to convert original documents from paper format to digital format efficiently while preserving information contained in the original document.

Figure 3:
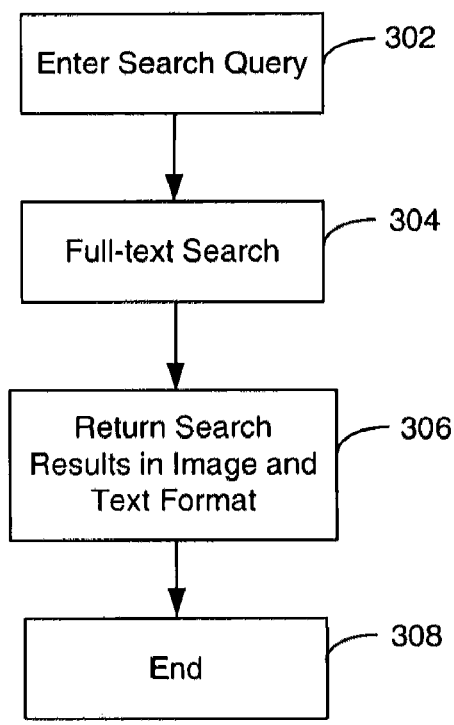
FIG. 3 illustrates a method for searching information from the relational database of FIG. 2 according to an embodiment of the present invention.

FIG. 3 illustrates a method for searching information from the relational database of FIG. 2 according to an embodiment of the present invention. In this example, the method starts in block 302 where the user enters a search query. Next the method conducts a full-text search in block 304 against the relational database, which includes documents stored in both text and image formats that are created and stored by the method described in FIG. 2. The full-text search is performed on the text version of the documents or on keywords associated with the document to generate search results that match the search query. In block 306, the method returns the search results that include documents in both image and text formats. The method ends in block 308.

Note that there are various approaches for capturing information as an image, including taking photos with a digital camera or scanning a paper document with a scanner. These devices are commonly available to users in today's business environment. It is beneficial for a user to be able to quickly capture information as images and process them in an efficient manner. For example, a user may conveniently take a picture of an advertisement on a billboard, scan a business card, or take a picture of meeting minutes. These image documents can be transferred to a computer in a variety of image formats such as .bmp, .gif, .jpg, .pcd, .pct, .pict, .pcx, .pdf, .png, .tga, .vda, .icb, .vst, .tidd, .tif, .psb, .pdp, .sct, etc.

According to embodiments of the present invention, a full-text search method is employed. In the full-text search method, a computer program sets up an index for each word in a document by scanning the whole document, and indicates the positions and the number of times a word appears in the document. When a search query is received, the search program can lookup in the previously established index according to a search algorithm, and provide search results to the user.

The full-text searching method may be implemented in different ways, such as searching by a keyword or searching by a phrase. The searching by a keyword approach sets up an index for each word in the document. In this case each phrase in the document may be broken up into a combination of words. For different languages, each keyword or phrase may have different meanings. Therefore, the search algorithm takes the meaning and context of the surrounding sentences into consideration. In addition, there are other differences between different languages that need to be resolved. For example, in a Western language like the English, each word is separated by a space. So the space and other special characters, for example punctuations, are used to identify the boundaries of words and phrases. While in an Eastern language like the Chinese, there is no space between words. Thus, font size, typesetting, and special characters (such as punctuations and spaces) are used to identify the boundaries of words and phrases. Searching by keyword sets up an index for each word, for example each semantic unit, in the document. The searching process is based on words, and may also add the capabilities to recognize synonyms.

According to embodiments of the present invention, an optical character recognition (OCR) conversion process is used. The OCR process may be regarded as a translation of images of text (by scanning or other optical input methods) into computer-editable text. The OCR process may automatically estimate, split, recognize, and convert different kinds of general presswork forms, achieving satisfying results on the comprehension of the forms. It can automatically analyze a document's layout, divide its sections and estimate the corresponding properties of headers, horizon lines, images and forms, as well as determine the recognition order. The recognition results can be saved as a new document which has a same display format (page setting) and layout as the scanned manuscript.

An automatic form inputting technique can automatically recognize not only the printed characters, letters, figures, but also handwritten characters, symbols, and figures. It promotes the efficiency of data entry for tables by saving time and effort for performing such tasks. This technique can change the recognition forms directly to commonly used document formats, such as .pdf, .html, .doc, and .pft. Also, it applies the automatic typeset analyzing on horizontal text, vertical text, and form text that are embedded in the image.

According to embodiments of the present invention, one application of the image-based data management system is to be used for storing, organizing, and accessing business cards.

In today's continuous expansion of the business social network as well as in business meetings, people exchange business cards frequently. Their business card collection has become larger and larger. It is important to be able to store, manage, and access such large business card collection in an efficient manner. Although there are some business card management software applications and tools currently available, for example Microsoft Outlook produced by Microsoft Corporation, but people typically enter the information on their business cards into Microsoft Outlook manually. This manual data input step is not only inefficient; it also loses some information contained in the business cards, such as a company's logo. The image-based data management system of the present invention is adapted to address these problems, and the system is also referred to as the business cards management system (BCMS).

In general, using the image-based data management system described above, a user may use commonly available devices such as digital cameras or scanners to capture images of the business cards and transfer them to a computer. These image documents can then be recognized by an OCR process, and each text field on the business card can be matched to certain categories of information such as a company's name, name of the person, address, email address, website, etc. Also, the OCR results may be revised, and the user may save the text fields as well as the images of the business cards into a relational database for subsequent full-text indexing and searching.

In one implementation, the BCMS system is a web-based software system. Each user can register its account on BCMS' website to download and install the client software for recognizing and uploading business cards (client software interface shown in FIG. 4A). Using the client software, the characters on the JPG document of the business card can be recognized, and the property of each text field can be setup in a visual equivalent grid mode. After revising the recognition results, the JPG document and the text field information can be uploaded into BCMS website's server. All these uploading information can be saved and indexed into a database for searching and managing.

The BCMS website provides the recognition function at the server end. Thus, the user does not need to download the client software, but only upload the image format of the documents onto the server. These documents can be recognized in the server end, and can be set and revised on the web-based operating platform. An advantage of web-based system is that a user can save his business cards information in the server, and avoid losing the information if his personal computer breaks down or if he loses his PDA. The information saved on the server can be shared between a user and his friends. Whenever or wherever the user may be, he may use an internet-capable device, for example personal computer, PDA, or mobile phone, to login to the BCMS website to manage and search his personal business cards. In addition, he may also share his business cards data in 'Vcard' format and send them to any other devices that support the 'Vcard' format.

Figure 4A:
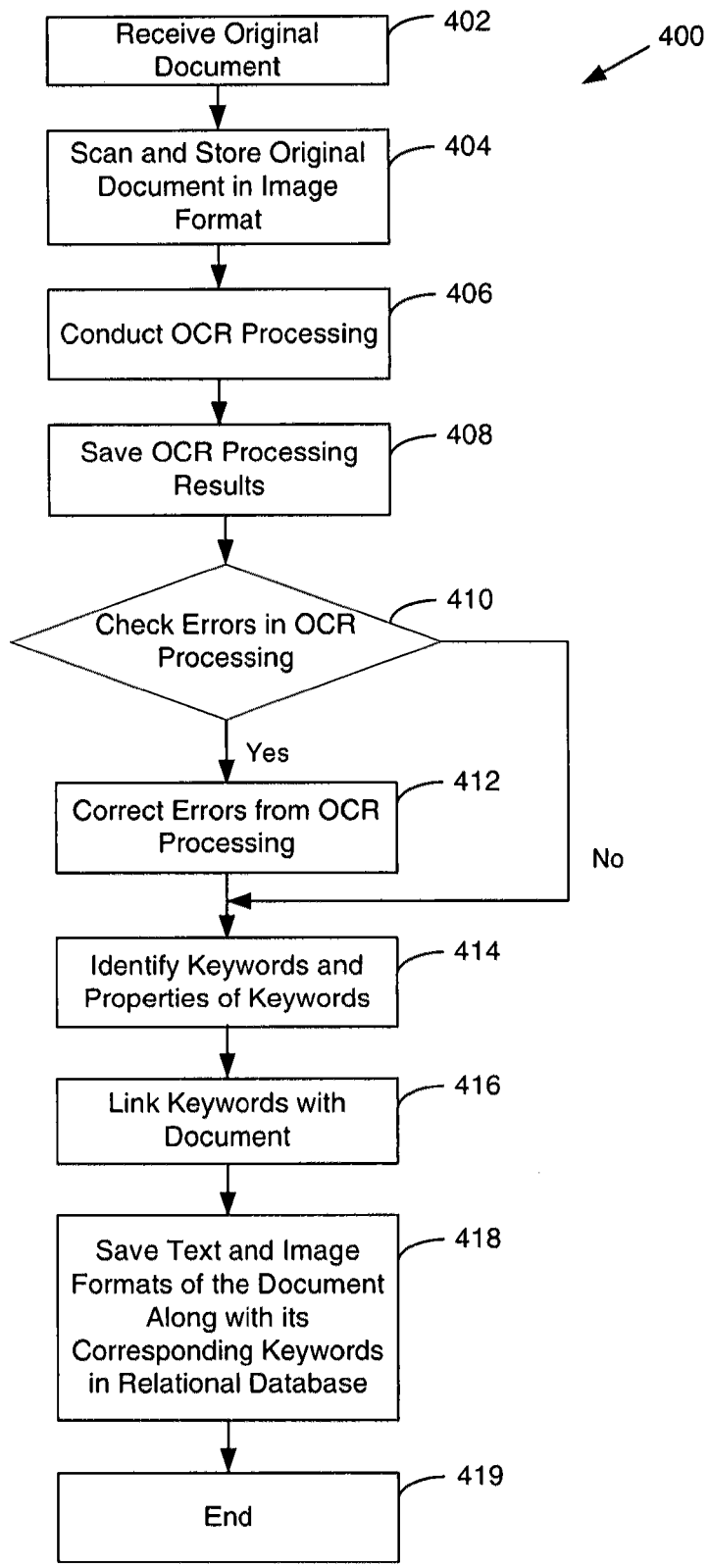
FIG. 4A illustrates an implementation of processing image-based data at a client site according to an embodiment of the present invention.

FIG. 4A illustrates an implementation of processing image-based data at a client site according to an embodiment of the present invention. As shown in FIG. 4A, an image-based document, such as information on a business card, can be stored, processed, organized, and accessed at a client site through the method 400. The method starts with receiving an original document in block 402 and thereafter, it moves to block 404 where the method scans and stores the original document to create an image of the document in an image format. In block 406, the method performs OCR processing of the scanned document to convert the document from an image format to a computer editable text format. In block 408, the method saves the OCR processing results from block 406 in a grid form. The grid form is shown in FIGS. 5A-5D and further discussed in their corresponding descriptions of the FIGS. 5A-5D.

In block 410, the method checks for errors in the OCR processed document created in block 406 and saved in block 408. A determination is made as to whether there are errors in the OCR processed document. If there are no errors found in the OCR processed document (410_No), the method moves to block 414. In the alternative, if there are errors found in the OCR processed document (410_Yes), the method moves to block 412 where the method corrects the errors created from the OCR processing.

In block 414, the method analyzes the OCR processed document and identifies keywords and their associated properties of the keywords. In block 416, the method links the document with the keywords and their associated properties. In block 418, the method saves both the text and image formats of the document along with the keywords of the document in a relational database. The stored information enables subsequent search of the document in the relational database with the keywords identified. The method ends in block 419.

Figure 4B:
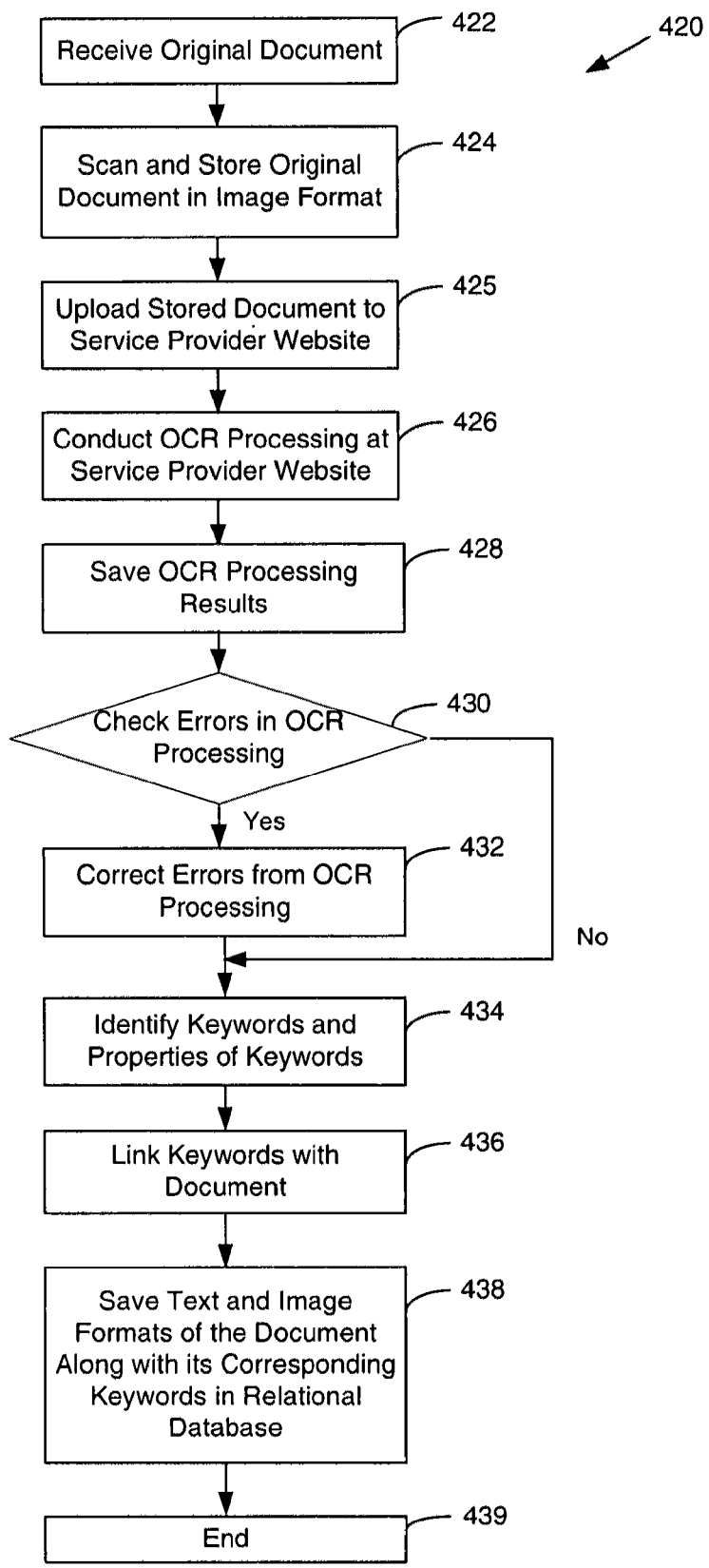
FIG. 4B illustrates an implementation of processing image-based data at a server site according to an embodiment of the present invention.

FIG. 4B illustrates an implementation of processing image-based data at a service provider's website according to an embodiment of the present invention. Similar to the method shown in FIG. 4A, Image-based data can be recorded and processed at a service provider's website through the method 420. The method starts with receiving an original document in block 422 and thereafter, it moves to block 424 where the method scans and stores the original document to create an image of the document in an image format. In block 425, the method logins in to a service provider's website and uploads the stored original document in the image format to the service provider's website. In block 426, the method performs OCR processing of the scanned document to convert the document from an image format to a computer editable text format. In block 428, the method saves the OCR processing results from block 426 in a grid form. Examples of the grid form are shown in FIGS. 5A-5D and further discussed in their corresponding descriptions of the FIGS. 5A-5D.

In block 430, the method checks for errors in the OCR processed document created in block 426 and saved in block 428. A determination is made as to whether there are errors in the OCR processed document. If there are no errors found in the OCR processed document (430_No), the method moves to block 434. In the alternative, if there are errors found in the OCR processed document (430_Yes), the method moves to block 432 where the method corrects the errors created from the OCR processing.

In block 434, the method analyzes the OCR processed document and identifies keywords and their associated properties of the keywords. In block 436, the method links the document with the keywords and their associated properties. In block 438, the method saves both the text and image formats of the document along with the keywords of the document in a relational database. The stored information enables subsequent search of the document in the relational database with the keywords identified. The method ends in block 439.

Figure 5A:
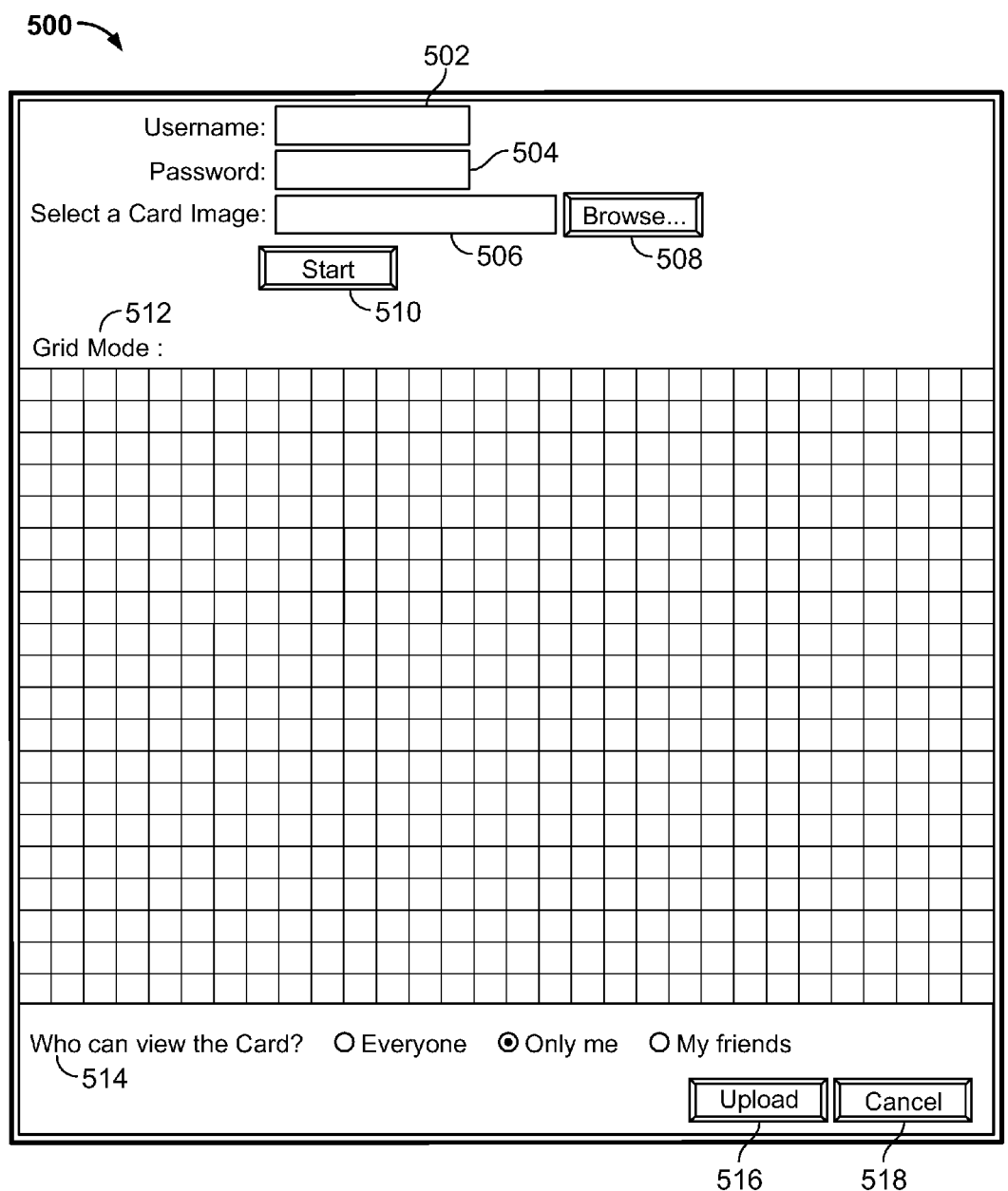
FIGS. 5A-5E illustrate a method for storing, organizing, and accessing business cards according to embodiments of the present invention.

FIGS. 5A-5E illustrate a method for storing, organizing, and accessing business cards according to embodiments of the present invention. FIG. 5A illustrates a user interface for organizing business cards according to an embodiment of the present invention. In this example, the user interface 500 provides a username field 502 and a password field 504 that may be used together for authenticating the user. A select a card image field 506 is provided where the user may enter a directory path to a business card file in the system. Alternatively, the user may use the browse button 508 to find a business card file in the system. The start button 510 activates the OCR process that reads the business card file in an image format and displays it in a grid mode 512 according to each character's position in the business card. The user interface further provides the user options regarding who may view the business card 514. For example, the user may select 1) everyone, 2) only me, or 3) my friends who are given the permission to be able to view the business card. In this example, the "only me" (also referred to as "owner only") option is selected by the user. The Upload button 516 allows the user to upload a business card to a service provider's website, and the Cancel button 518 allows the user to cancel the operations that may have been performed on a particular business card and repeat the process.

Figure 5B:
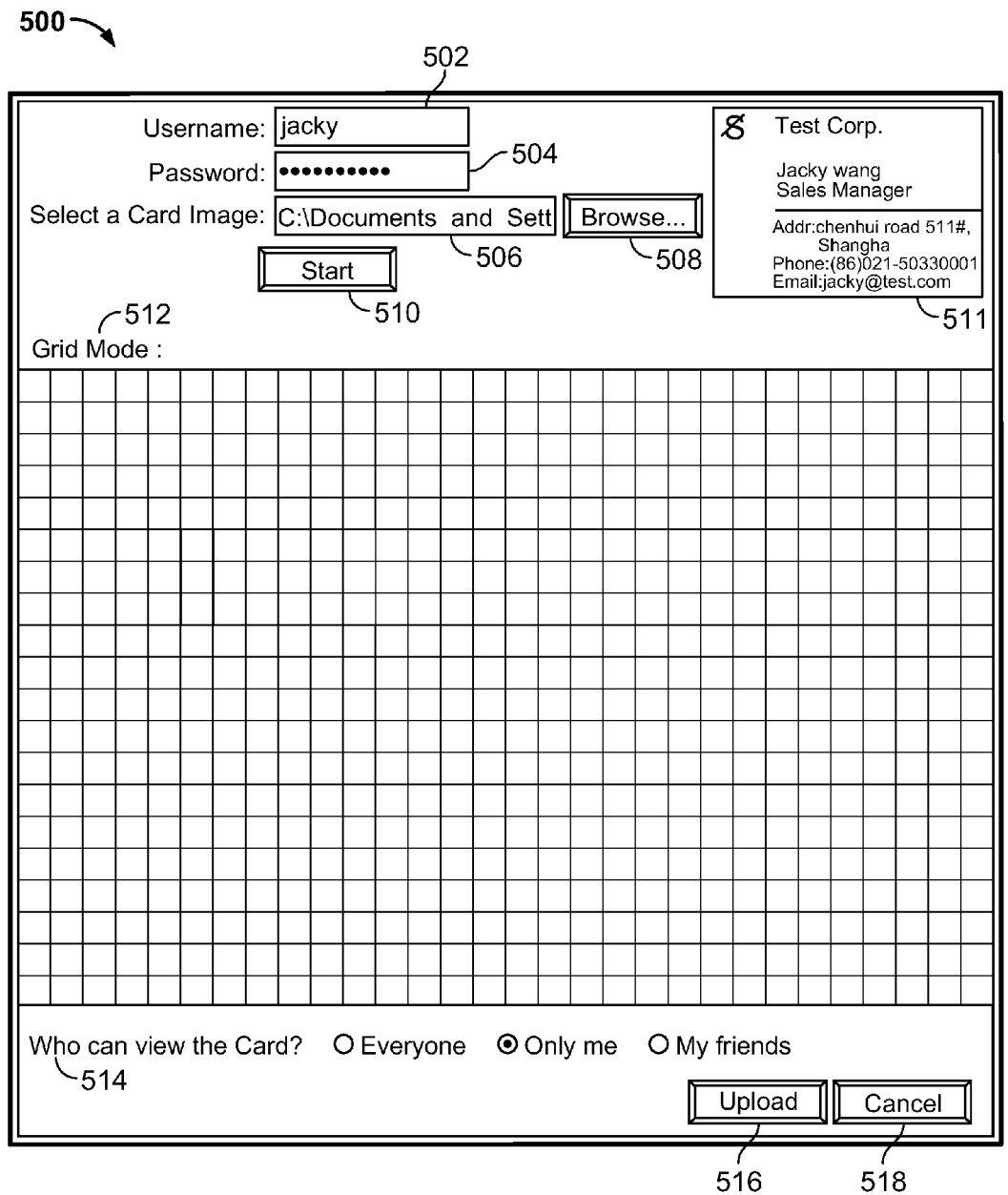

FIG. 5B illustrates an example of the user interface of FIG. 5A being used according to an embodiment of the present invention. As shown in FIG. 5B, the user enters "jacky" in the username field 502, and a ten character password is entered in the password field 504. In addition, the user has provided a path to a business card, and an image of the business card is shown as item 511.

Figure 5C:
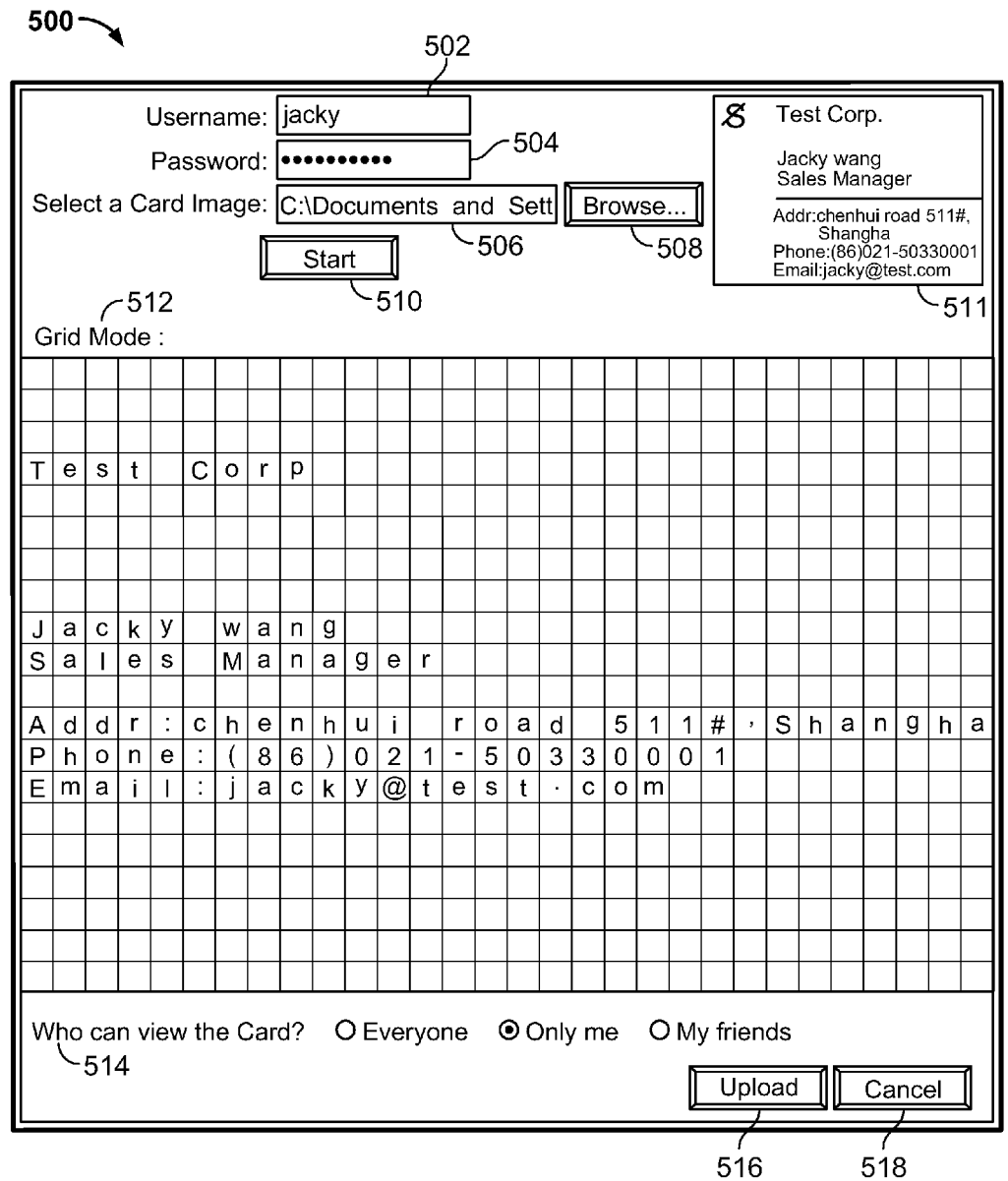

FIG. 5C illustrates an example of displaying a business card in grid mode according to an embodiment of the present invention. As shown in FIG. 5C, each character of the original business card is displayed in a grid according to its corresponding position in the business card. In the grid mode, the user may check for the correctness of the information contained in the grid, which is automatically created by the OCR process discussed in block 208 of FIG. 2 (block 406 of FIG. 4A or block 426 of FIG. 4B).

Figure 5D:
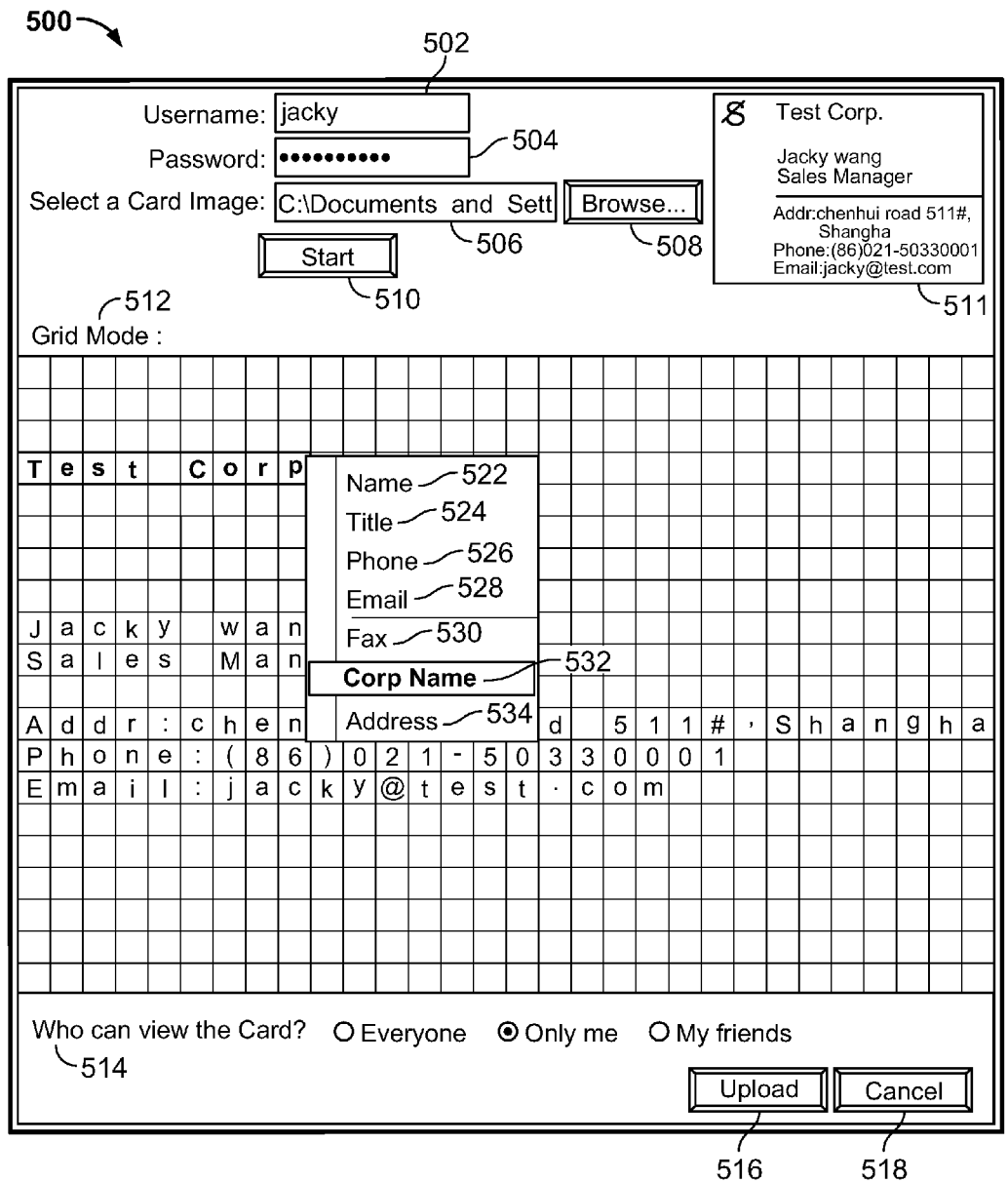

FIG. 5D illustrates a method of identifying keywords and corresponding properties the keywords according to an embodiment of the present invention. In the approach shown in FIG. 5D, a user may select certain text information, for example "Text Corp" as highlighted in FIG. 5D. Then, the user may right-click to select from a pull-down menu 520 a property that relates to the text being selected. For example, the corresponding properties of keywords in a business card may include Name 522, Title 524, Phone 526, Email 528, Fax 530, Corporation Name 532, Address 534, URL to website (not shown), etc. of the person named in the business card 511. In this example, the selected text "Test Corp" is the Corporation Name 532 of the business entity shown in the business card.

From FIG. 5A to FIG. 5D, after setting up the BCMS account's registration information in the client software and choosing the image, after the user clicks the 'start' button, the OCR software begins to recognize the characters in the business card and put them in the grid mode accordance with their original positions. Then the user can edit and revise the OCR results, also the user may use select certain characters and then right click to set up the property of the selected text using the pop-up menu. Using the grid mode environment, the user may be guided to input information in a convenient manner. After finishing the above procedures, the user can click the 'upload' button to upload the OCR results and the image file of the business card onto the BCMS server, or otherwise click 'cancel' to cancel the OCR results to start over again.

As discussed above, the method described in FIGS. 5A-5D may be applied to to manage a user's business cards. In one approach, a user may use a digital camera or camera phone to take a photo image of a business card. The image file of the business card may then be transferred to a computer. Then, the user may use client application software to retrieve the information in the image file to a computer editable text format. The method can then put the recognition results in a grid, where each character occupies one space in the grid, and each character may be edited. The user has the opportunity to edit and revise the OCR results in the grid. In addition, the user is able to select characters in multiple spaces in the grid, and associate the selected characters with user-defined properties. Examples of user-defined properties may include name, title, company name, telephone number, email address, URL to website, etc. Then, the user may upload both text and image format of the business card, which will be stored onto the server. In the server, the business card information can be indexed for support of subsequent searching by the user.

Figure 5E:
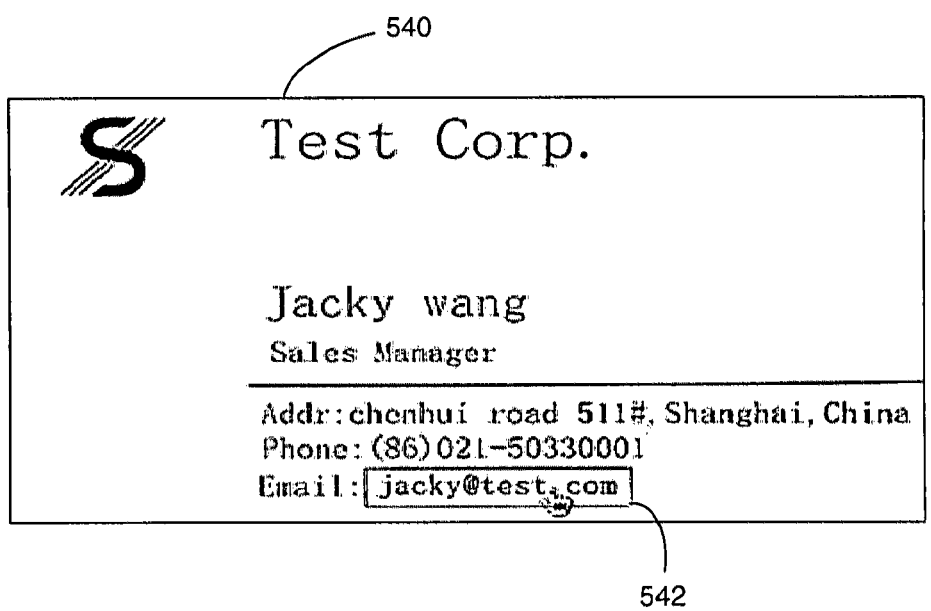

FIG. 5E illustrates a method for establishing a hyperlink to certain content on a business card according to an embodiment of the present invention. When setting up a business card, the method may automatically create a hyperlink based on the text field's property entered by the user. For example, the method may automatically add a hyperlink 542 on the email address of the person listed in the business card 540. After the hyperlink 542 is created for the email address, the user may simply click the hyperlink 542 to invoke an email program if he wishes to send an email to the person listed on the business card. In this manner, it saves the user time and effort of manually entering the email address from a business card 540. In addition, the name of the company may be linked to the company's webpage. Thus if the user clicks on the name of the company on the business card, the corresponding URL of the company's webpage may be accessed by the browser. Similarly, the address of the company on the business card can be linked to an internet map application, such as the Yahoo Maps. Once the address is clicked, the browser opens automatically and its location can be shown on the Yahoo map. Also, an automatic-calling function can be added to the telephone and mobile numbers, once the phone numbers are chosen by the user, a phone calling program like SKYPE, net-meeting may be activated. As shown in the above examples, the insertion of automatic hyperlinks makes the business card more user-friendly and more accessible to the users.

Figure 6:
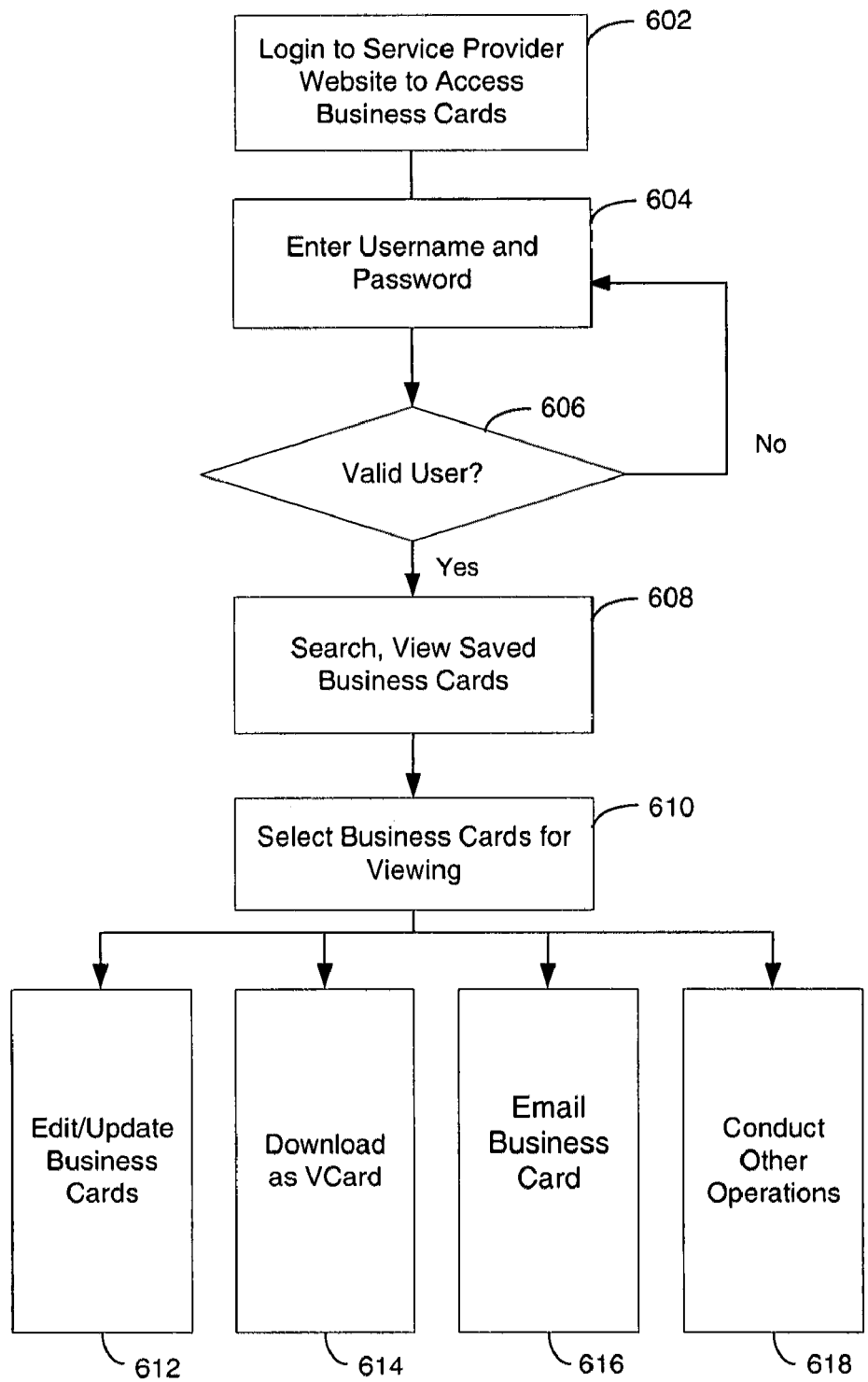
FIG. 6 illustrates a method for accessing and using saved business cards according to an embodiment of the present invention.

FIG. 6 illustrates a method for accessing business cards on a service provider website according to an embodiment of the present invention. In general, the user may access his business card management webpage on a service provider website at any time, from anywhere, and with any device, such as PDA, cellular phone, personal computer, etc. In the webpage, the user may search and view the business cards by keywords, and choose a specific business card to revise or edit and correct. The information may be retrieved in VCard format and transferred to Microsoft Outlook or other VCard-capable communication software and devices. The user can also share the business card with his friends by forwarding the VCard document to them via electronic messages.

As shown in the exemplary flow diagram of FIG. 6, the method starts in block 602 where a user logins to a service provider website to access business cards information. In block 604, the method prompts the user to enter his username and password for authenticating the user. In block 606, a determination is made as to whether the username and password entered in block 604 correspond to a valid user. If the username and password entered match to a valid user (606_Yes), the method continues in block 608. In the alternative, if the username and password entered do not match to a valid user (606_No), the method repeats block 604 and 606 to prompt the user to re-enter his username and password for verification.

In block 608, after the user has been authenticated, the method allows the user to search and view previously saved business cards in a database managed by the service provider. In block 610, the method may enable the user to select business cards for viewing. After viewing a business card, the method allows the user to edit/update the business card 612, download the business card as a VCard 614, email the business card as a VCard 616, or conduct other operations with the business cards 618.

Figure 7:
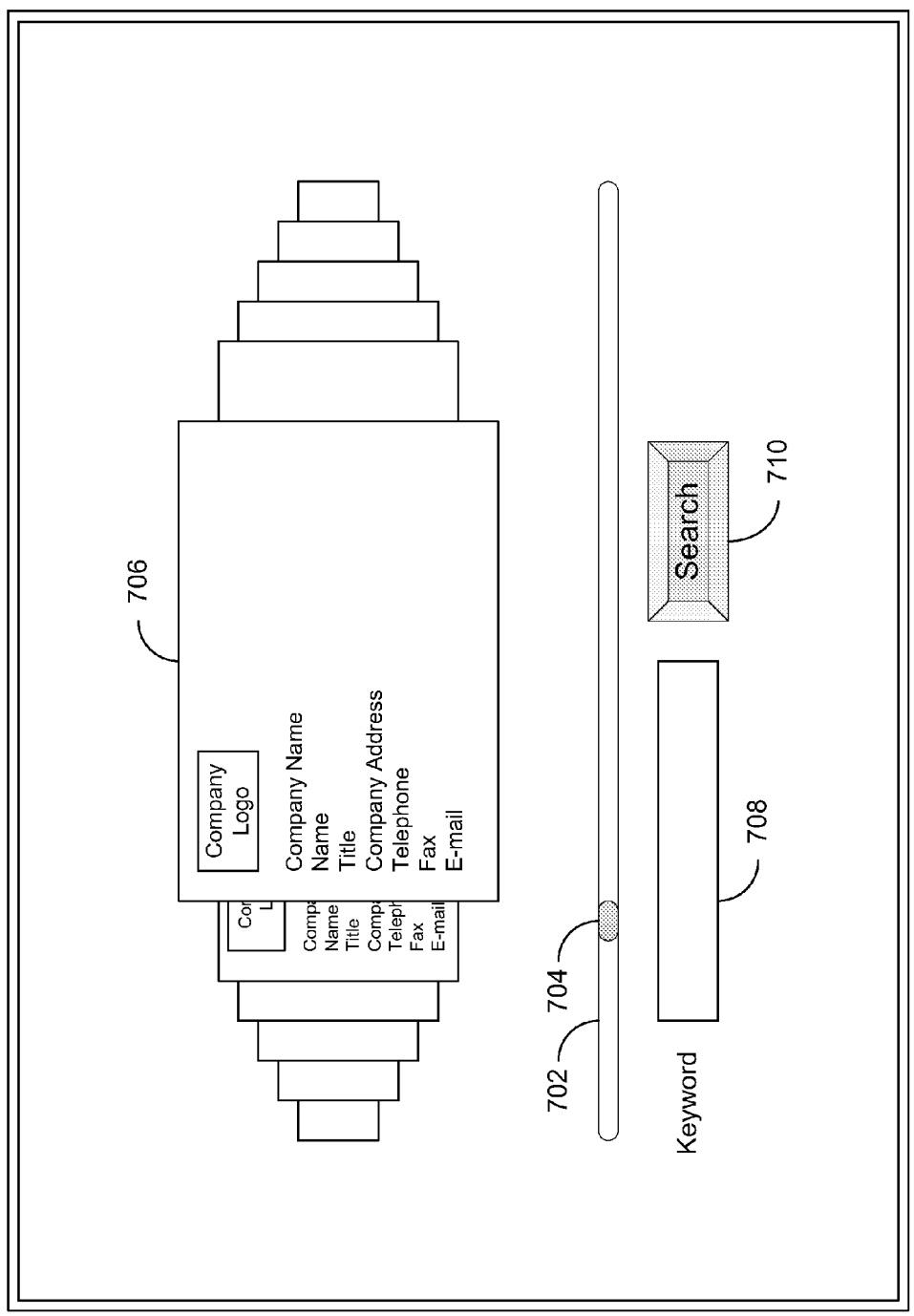
FIG. 7 illustrates a method for displaying saved business cards according to an embodiment of the present invention.

FIG. 7 illustrates a method for viewing saved business cards according to an embodiment of the present invention. In browsing and searching business cards, a Rolo-view that creates an animated enlargement effect may be made available to the user. In one embodiment, the user may drag a scroll bar 704 along a scroll line 702. When the scroll bar is dragged from right to left, the business cards rotate from right to left. On the other hand, when the scroll bar is dragged from left to right, the business cards rotate from left to right. The user may also search for business cards by entering keyword(s) in the search box 708, and then press the search button 710. During a search, a display of the business cards being rotated (and being searched) is shown to the user. When a business card that meets the searching criteria is found, the business card is displayed to the user in focus.

Figure 8:
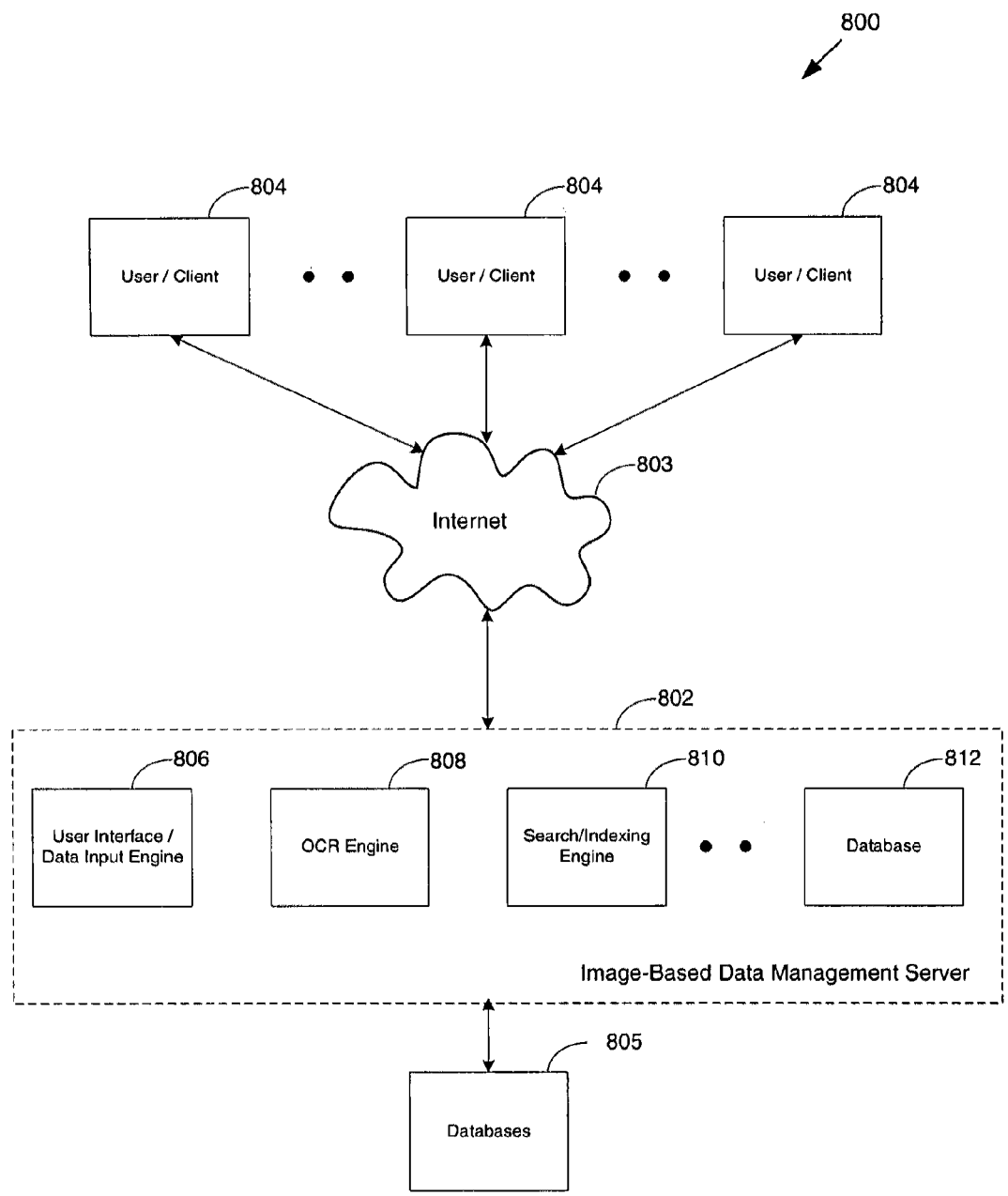
FIG. 8 illustrates a system for organizing business cards according to an embodiment of the present invention.

FIG. 8 illustrates a system for organizing business cards according to an embodiment of the present invention. The system 800 includes one or more Image-based data management servers 802, and one or more clients 804. The servers 802 interface with the clients 804 via the Internet 803. The servers further include a plurality of application engines, for example, a user interface/data input engine 806, an OCR engine 808, a search/indexing engine 810, and a database 812. An application engine is a computer system implemented with different hardware and software for a specific application, such as the applications shown in FIG. 8. The application engines implement Web 2.0 functionalities using a combination of HTML, CSS, JavaScript and "Asynchronous JavaScript and XML" (AJAX).

In particular, JavaScript is used to create, monitor, change and destroy objects and change the state of various objects, in addition to keeping track of browser behavior changes initiated by the user. For example, when a user starts dragging a business card image in the browser window, the browser fires "mouse down" and "mouse move" events which are captured by the JavaScript, and an object is created to handle the event. The object is effectively a copy of the original business card image, and the copy of the image is being moved around. When the object is put into the a Rolo-view, it is added to the Rolo-view controller object, which monitors this new object being added to it and continues to keep track of the object. Similarly, when the user removes a business card from the Rolo-view, the browser fires a "delete" event which is captured and result in the removal of the business card from the Rolo-view. In other words, each object has states, and such states are created and modified in response to user initiated changes (events) to the browser behavior.

In addition, the servers 802 may include the databases, processors, switches, routers, interfaces, and other components and modules. Each of the servers 802 may comprise one or more servers, or may be combined into a lesser number of servers than shown, depending on computational and/or distributed computing requirements. The servers 802 may be located at different locations relative to each other. The databases may also be separately connected to the servers 802. There may be more or fewer than two databases, depending on computational and/or distributed computing requirements. The databases may be located at different locations relative to each other and the servers 802.

Each of the clients 804 may be a general-purpose computer, such as a personal computer, having a central processing unit (CPU), a memory, an input device, an output device, and a display. Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the clients 804. Each of the clients 804 may also implement analog and digital baseband circuitry, power management circuitry, radio frequency (RF) transceiver, and battery interface and charging circuitry. Clients 804 may include one or more applications, program modules, and/or sub-routines. As an example, clients 804 may include a browser application (e.g., Internet Explorer, etc.) and a graphical user interface (GUI) to access websites and web pages provided by the servers 802 and data stored at the databases 805. Clients 804 may be remote from each other, the servers 802, and/or the databases 805.

The network 803 is a communications network, such as a local area network (LAN), a wide area network (WAN), or the Internet. When the network 803 is a public network, security features (e.g., VPN/SSL secure transport) may be included to ensure authorized access within the system.

As described above, the process of monitoring and updating states of an object is event driven. When a user performs a specific action, JavaScript that runs in the background determines the exact browser event that has been initiated according to a set of user cases. For example, if the user clicks outside of a business card and drags, that action is interpreted as the intent to draw a selection rectangle. Similarly, if the user clicks directly on an image and starts to move by a distance greater than five pixels, that action is interpreted as a drag. Then, the JavaScript starts to monitor the mouse movement and attaches the business card images to the cursor at that point. While moving the cursor, the JavaScript updates the attached images' positions and waits for the user to release the image. Upon the images being released, the JavaScript determines the location of the cursor within the browser window. If the images are dropped on the Rolo-view, they are appended alongside the other images in the Rolo-view. If the images are dropped on an invalid drop target, a reset action is initiated and the images are snapped back to their original locations. While the user is dragging thumbnail images, the JavaScript monitors where the cursor is, and determines whether it is over a valid drop target or an invalid drop target. In the case that the cursor is over a valid drop target, the JavaScript would cause the valid drop target to be highlighted, providing a positive feedback to the user. When the cursor moves out of the valid drop target, the JavaScript would deactivate the highlighted area. This series of events is also referred to as the "hover" effect.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for organizing business cards, comprising:
   receiving a business card in image format;
   conducting an optical character recognition (OCR) conversion process to produce an equivalent business card in text format;
   identifying keywords of the equivalent business card in text format;
   linking the keywords with the business card in image format and the corresponding equivalent business card in text format;
   storing the business card in image format, the corresponding business card in text format, and the keywords in a relational database;
   searching against the keywords and the business card in text format in the relational database in accordance with a search query; and
   providing the business card in image format and the corresponding equivalent business card in text format in response to one or more keywords that match the search query.

2. The method of claim 1, wherein receiving a business card in image format comprises at least one of:
   receiving the business card in image format from a scanner;
   receiving the business card in image format from a digital camera;
   receiving the business card in image format from a personal digital assistant (PDA);
   receiving the business card in image format from a personal computer; and
   receiving the business card in image format from a cellular telephone.

3. The method of claim 1 further comprises saving the business card in image format in at least one of the following digital image format: bmp, gif, jpg, pcd, pct, pict, pcx, pdf, png, tga, vda, icb, vst, tidd, tif, psb, pdp, and sct.

4. The method of claim 1, wherein the equivalent business card in text format is arranged in a grid, and wherein each character in the business card is stored in a corresponding location in the grid.

5. The method of claim 1, wherein conducting an optical character recognition conversion process further comprises:
   checking for errors produced by the OCR conversion process; and
   correcting errors in the equivalent business card in text format in response to errors found.

6. The method of claim 1, wherein identifying keywords further comprises:
   using font size, typesetting and special characters to identify boundaries of keywords in Western language and Eastern language.

7. The method of claim 1 further comprising:
   setting permissions for viewing the business card, wherein the permissions include at least one of everyone, friends, and owner only.

8. The method of claim 1 further comprising at least one of:
   creating a first URL linking a company name on the business card to the company's homepage on the web;
   creating a second URL linking an address on the business card to an internet map application for retrieving location and driving directions to the address;
   creating a third URL linking a phone number on the business card for automatically dialing the phone number; and
   creating a fourth URL linking an email address on the business card to an email application for sending an email to the email address.

9. A system for organizing business cards on a website, comprising:
   one or more servers for interface between client devices through a communication network, the one or more servers further comprise:
   logic configured to receive a business card in image format;

logic configured to conduct an optical character recognition (OCR) conversion process to produce an equivalent business card in text format;

logic configured to identify keywords of the equivalent business card in text format;

logic configured to link the keywords with the business card in image format and the corresponding equivalent business card in text format;

logic configured to store the business card in image format, the corresponding business card in text format, and the keywords in a relational database;

logic configured to search against the keywords and the business card in text format in the relational database in accordance with a search query; and logic configured to provide the business card in image format and the corresponding equivalent business card in text format in response to one or more keywords that match the search query.

10. The system of claim 9, wherein the logic configured to receive a business card in image format comprises at least one of:

logic configured to receive the business card in image format from a scanner;

logic configured to receive the business card in image format from a digital camera;

logic configured to receive the business card in image format from a personal digital assistant (PDA);

logic configured to receive the business card in image format from a personal computer; and logic configured to receive the business card in image format from a cellular telephone.

11. The system of claim 9 further comprises logic configured to save the business card in image format in at least one of the following digital image format: bmp, gif, jpg, pcd, pct, pict, pcx, pdf, png, tga, vda, icb, vst, tidd, tif, psb, pdp, and sct.

12. The system of claim 9, wherein the equivalent business card in text format is arranged in a grid, and wherein each character in the business card is stored in a corresponding location in the grid.

13. The system of claim 9, wherein the logic configured to conduct an optical character recognition conversion process further comprises:

logic configured to check for errors produced by the OCR conversion process; and logic configured to correct errors in the equivalent business card in text format in response to errors found.

14. The system of claim 9, wherein the logic configured to identify keywords further comprises:

logic configured to use font size, typesetting and special characters to identify boundaries of keywords in Western language and Eastern language.

15. The system of claim 9 further comprising:

logic configured to set permissions for viewing the business card, wherein the permissions include at least one of everyone, friends, and owner only.

16. The system of claim 9 further comprising at least one of:

logic configured to create a first URL linking a company name on the business card to the company's homepage on the web;

logic configured to create a second URL linking an address on the business card to an internet map application for retrieving location and driving directions to the address;

logic configured to create a third URL linking a phone number on the business card for automatically dialing the phone number; and logic configured to create a fourth URL linking an email address on the business card to an email application for sending an email to the email address.

17. A method for organizing image-based data, comprising:

receiving an image-based document;

conducting an optical character recognition (OCR) conversion process to produce an equivalent document in text format;

identifying keywords of the equivalent document in text format;

linking the keywords with the image-based document and the corresponding equivalent document in text format; and storing the image-based document, the corresponding equivalent document in text format, and the keywords in a relational database;

searching against the keywords and the equivalent document in text format in the relational database in accordance with a search query; and providing the image-based document and the corresponding equivalent document in text format in response to one or more keywords that match the search query.

18. The method of claim 17, wherein receiving an image-based document comprises at least one of:

receiving the image-based document from a scanner;

receiving the image-based document from a digital camera;

receiving the image-based document from a personal digital assistant (PDA);

receiving the image-based document from a personal computer; and receiving the image-based document from a cellular telephone.

19. The method of claim 17 further comprises saving the image-based document in at least one of the following digital image format: bmp, gif, jpg, pcd, pct, pict, pcx, pdf, png, tga, vda, icb, vst, tidd, tif, psb, pdp, and sct.

20. The method of claim 17, wherein the equivalent document text format is arranged in a grid, and wherein each character in the image-based document is stored in a corresponding location in the grid.

21. The method of claim 17, wherein conducting an optical character recognition conversion process further comprises:

checking for errors produced by the OCR conversion process; and correcting errors in the equivalent document in text format in response to errors found.

22. The method of claim 17, wherein identifying keywords further comprises:

using font size, typesetting and special characters to identify boundaries of keywords in Western language and Eastern language.

* * * * *